Patented July 29, 1924.

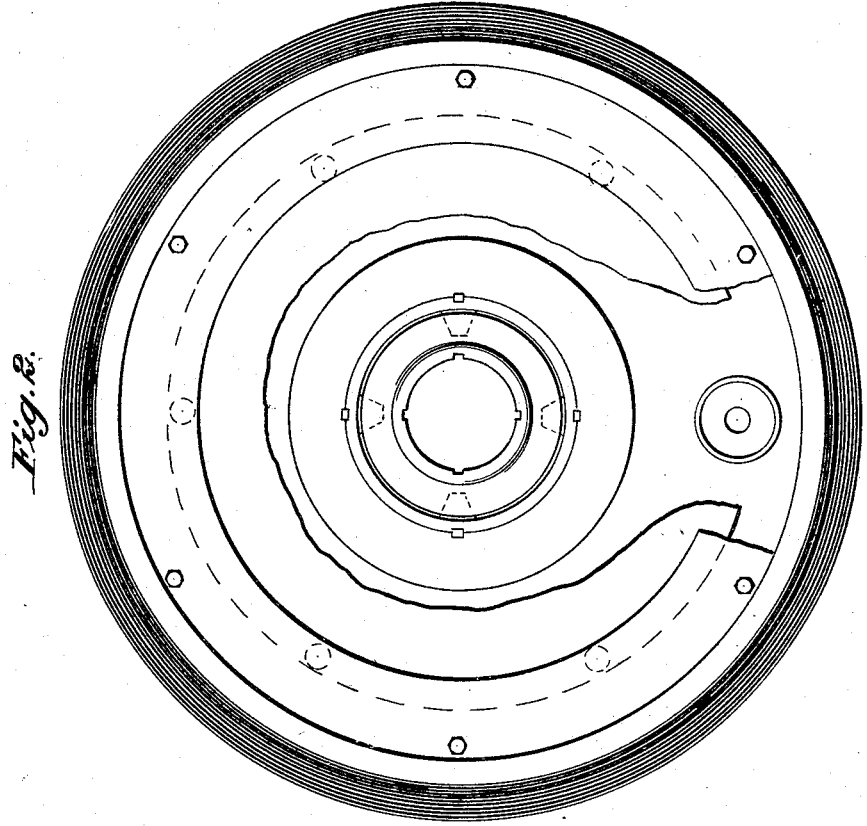
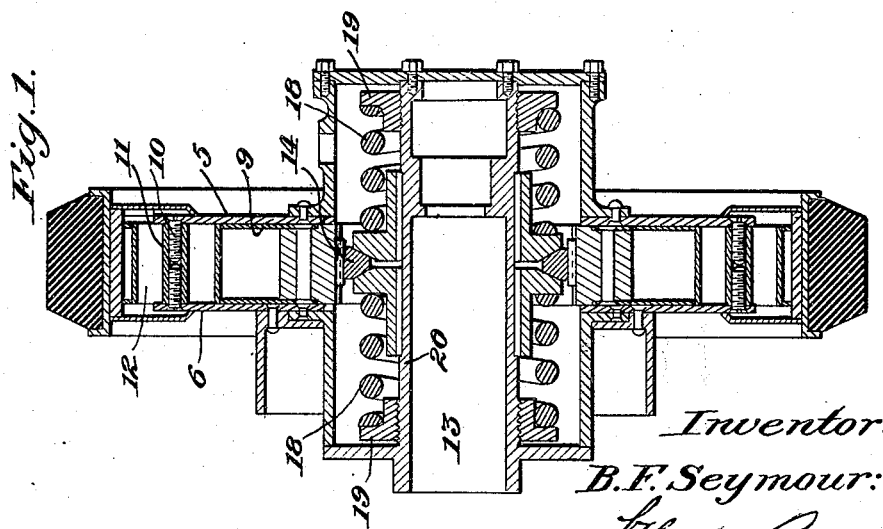

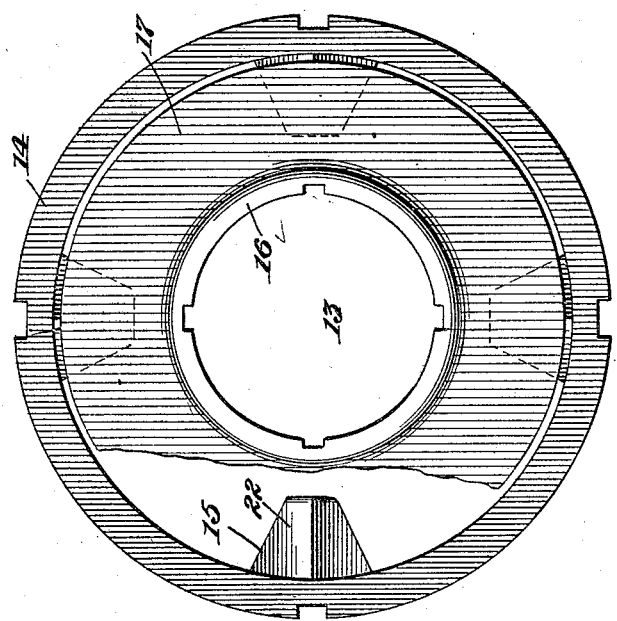
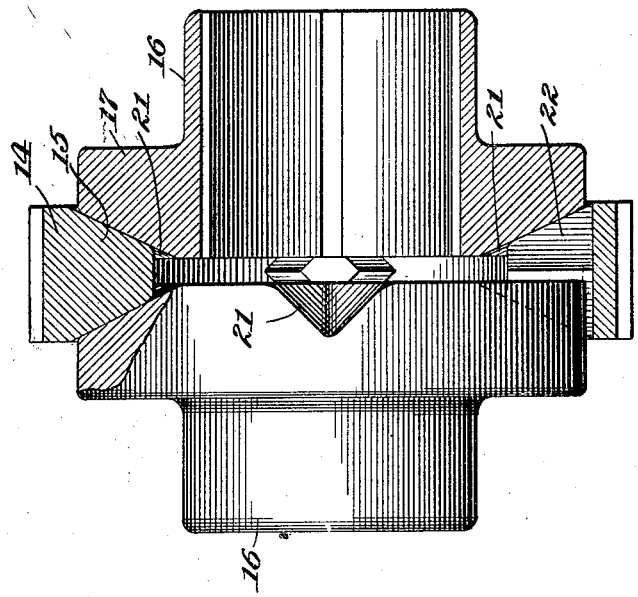

1,503,137

UNITED STATES PATENT OFFICE.

BENJAMIN F. SEYMOUR, OF WASHINGTON, DISTRICT OF COLUMBIA.

RESILIENT TRANSMISSION AND BEARING.

Application filed September 9, 1919. Serial No. 322,628.

*To all whom it may concern:*

Be it known that I, BENJAMIN F. SEYMOUR, a citizen of the United States, residing at Washington, District of Columbia, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

This invention is characterized in that the resilient transmission and bearing is disposed to either side of the wheel rim to the end of obtaining substantially complete flexibility with maximum rigidity of wheel structure.

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section of the transmitting and bearing elements per se, and Figure 4 is a similar view thereof taken at right angles to Figure 3.

Referring to the construction in further details and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood of course that said spaces 12 are provided to allow the wheel rim to have limited radial movement with respect to the axis 13 of the wheel.

The resilient transmission and bearing device per se consists of a plurality of radially and inwardly disposed pyramidal portions 15 formed on or detachably secured to the rim portion 14 of the wheel (see Figs. 3 and 4). The surfaces 22 of the members 15 are disposed on opposite sides of the wheel rim and serve respectively for transmitting the forward or reverse drive to the wheel rim and as a bearing for the rim upon the hub.

Disposed on either side of the pyramidal members 15 and cooperable therewith is a pair of slidable and oppositely acting sleeves 16 that are provided each with a head portion 17 that is held in operative position against the angular surfaces of said members 15 and under the required tension by the springs 18, said springs 18 seat against the heads 17 and the collars 19, which latter are in turn adjustably mounted on the hub part 20, for regulating the degree of spring tension as shown.

Each of the members 17 is formed with a plurality of relatively angular surfaces 21 adapted to coact with the complemental surfaces 22 of the several members 15 of the wheel rim, as shown. In the present instance, the angular or cam surfaces 21 and 22 are shown as disposed at angles of 45 degrees, though it will be understood of course that this angular relation is purely an arbitrary one and may be varied as occasion requires.

In operation, the combined resilient drive and transmission, between the wheel rim and hub, is sufficiently flexible for allowing freedom of movement of the rim with respect to its cushion or sustaining elements and is yet sufficiently rigid to afford a positive driving connection between said rim and the hub.

It will be obvious of course that different forms of construction may be provided in lieu of that disclosed and described herein.

And while I have shown and described certain apparatus for accomplishing the result initially stated, it is to be understood that I am not limited to the precise details shown but may on the other hand adopt such modifications or changes within the scope of the claims to better suit the end in view.

What I claim is:

1. In a combined resilient bearing and drive for vehicle wheels, the combination of a hub member, a wheel rim mounted to have limited radial movement thereon, said rim having a plurality of centrally disposed pyramidal shaped members, a pair of sleeves mounted to have axial movement on said hub member, said sleeves having portions provided with relatively angular surfaces cooperable with the angular surfaces of said pyramidal members, and springs normally holding said cooperable angular surfaces in contact to provide the bearing and drive, substantially as set forth.

2. In a combined resilient bearing and drive for vehicle wheels, the combination of a hub member, a wheel rim mounted to have limited radial movement on the hub member, said rim provided with a plurality of centrally disposed pyramidal members, a pair of sleeves splined on the hub and formed with head portions respectively, each of said head portions having plane angular surfaces cooperable with the angular surfaces of said pyramidal members, and a pair of springs mounted on said sleeves and holding said co-acting angular surfaces in contact and providing the bearing and drive, substantially as set forth.

In testimony whereof I affix my signature.

BENJAMIN F. SEYMOUR.